(12) United States Patent
Dobbin et al.

(10) Patent No.: US 12,031,564 B2
(45) Date of Patent: Jul. 9, 2024

(54) SPARK CONTAINMENT CAP

(71) Applicant: AIRBUS OPERATIONS LIMITED, Bristol (GB)

(72) Inventors: Richard Dobbin, Bristol (GB); Matthew Cross, Bristol (GB); Matthew Webster, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 327 days.

(21) Appl. No.: 17/515,363

(22) Filed: Oct. 29, 2021

(65) Prior Publication Data

US 2022/0136551 A1    May 5, 2022

(30) Foreign Application Priority Data

Oct. 29, 2020    (GB) ...................................... 2017193

(51) Int. Cl.
| | | |
|---|---|---|
| *F16B 33/00* | (2006.01) | |
| *F16B 37/14* | (2006.01) | |
| *B64D 45/02* | (2006.01) | |

(52) U.S. Cl.
CPC ............ *F16B 33/004* (2013.01); *F16B 37/14* (2013.01); *B64D 45/02* (2013.01); *F16B 33/00* (2013.01)

(58) Field of Classification Search
CPC ........ F16B 33/004; F16B 37/14; F16B 33/00; B64D 45/02; Y10S 411/91
USPC ..................................... 411/372.5, 372.6, 373
See application file for complete search history.

(56) References Cited

U.S. PATENT DOCUMENTS

| | | | | |
|---|---|---|---|---|
| 4,883,399 A | * | 11/1989 | MacLean | F16B 33/006 |
| | | | | 411/908 |
| 5,082,409 A | * | 1/1992 | Bias | F16B 37/14 |
| | | | | 411/372.5 |
| 7,308,842 B2 | | 12/2007 | Hufnagl et al. | |
| 9,416,811 B2 | | 8/2016 | Dobbin | |
| 9,764,854 B2 | * | 9/2017 | Dobbin | F16B 33/004 |

(Continued)

FOREIGN PATENT DOCUMENTS

| | | |
|---|---|---|
| EP | 0 496 356 | 7/1992 |
| EP | 3 492 389 | 6/2019 |

(Continued)

OTHER PUBLICATIONS

Extended European Search Report for Application No. EP 21202984. 7, four pages, dated Mar. 17, 2022.

(Continued)

*Primary Examiner* — Roberta S Delisle
(74) *Attorney, Agent, or Firm* — Nixon & Vanderhye P.C.

(57) ABSTRACT

A method of joining a first workpiece to a second workpiece is disclosed including securing a spark containment cap to the first workpiece, the cap comprising an electrically insulating washer and a cap body defining an air cavity. Once the cap has been secured, a tail of a fastener is inserted into the air cavity through the second workpiece, the first workpiece and the washer. Upon tightening the fastener, the tail of the fastener urges the washer against the first workpiece and the first and second workpiece are thereby clamped between the washer and a head of the fastener so as to form a joint. Advantageously, it has been found that forming a joint in this manner can help to better protect the joint from the effects of electrical arcing.

20 Claims, 10 Drawing Sheets

(56) References Cited

U.S. PATENT DOCUMENTS

| | | | |
|---|---|---|---|
| 10,294,976 B2 | 5/2019 | Bickford et al. | |
| 2013/0322982 A1* | 12/2013 | Dobbin | F16B 33/004 29/525.02 |
| 2015/0300397 A1* | 10/2015 | Dobbin | F16B 37/14 411/372.6 |
| 2016/0169266 A1* | 6/2016 | Dobbin | F16B 37/14 156/60 |
| 2016/0195125 A1* | 7/2016 | Dobbin | B64D 45/02 411/372.6 |
| 2016/0245330 A1* | 8/2016 | Dobbin | F16B 37/14 |
| 2017/0298979 A1* | 10/2017 | Aston | B64D 45/02 |
| 2019/0161206 A1* | 5/2019 | Dobbin | F16B 19/1054 |
| 2019/0301514 A1* | 10/2019 | Dobbin | F16B 37/14 |
| 2019/0301515 A1* | 10/2019 | Dobbin | F16B 33/004 |

FOREIGN PATENT DOCUMENTS

| | | |
|---|---|---|
| GB | 2520774 | 6/2015 |
| GB | 2535518 | 8/2016 |
| GB | 2584433 | 12/2020 |
| JP | 2013-245720 | 12/2013 |
| WO | 2009/063060 | 5/2009 |
| WO | 2014/114909 | 7/2014 |
| WO | 2020/239881 | 12/2020 |

OTHER PUBLICATIONS

Combined Search and Examination Report for GB2017193.0, dated Mar. 18, 2021, 5 pages.

* cited by examiner

FIG. 1

(Prior Art)

SPARK CONTAINMENT CAP

CROSS RELATED APPLICATION

This application claims priority to United Kingdom Patent Application GB 2017193.0, filed Oct. 29, 2020, the entire contents of which is hereby incorporated by reference.

FIELD OF THE INVENTION

The present invention relates to a method of joining a first workpiece and a second workpiece, a spark containment cap for use with said method, and a method of manufacturing said spark containment cap.

BACKGROUND OF THE INVENTION

Large passenger aircraft are typically struck by lightning once or twice a year, each lightning bolt striking with up to 200,000 amps of electrical current that seeks the path of least electrical resistance, which on metallic aircraft can be conducted away. Many modern passenger aircraft have exterior surfaces and structures made from composite materials which have a higher electrical resistance than metallic structures which cannot dissipate the energy over the surface of the structure. Therefore, on composite aircraft there is a risk of energy from a lightning attachment passing through the structure and generating sparking at the interfaces of the structure and the many fasteners. In the wing, some of these fasteners pass through the outer wing skin into the fuel tank.

Figure 1:
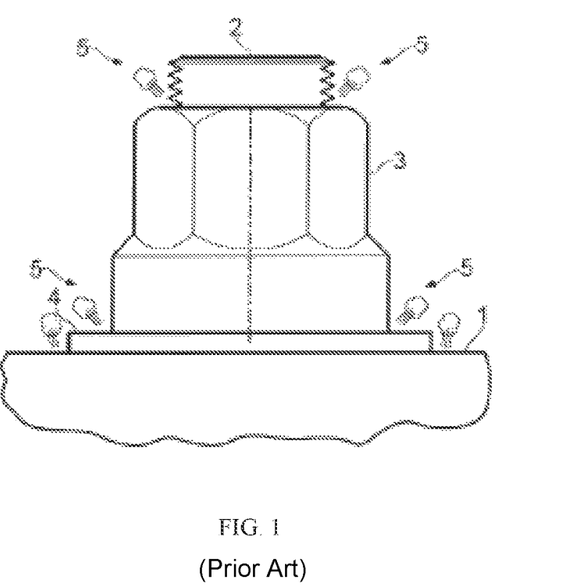
FIG. 1 is side view of a prior art fastener joint.

FIG. 1 is a side view of part of a fastener assembly passing through a panel 1, which may be a composite or metallic panel. The assembly comprises a fastener with an externally threaded bolt 2, an internally threaded nut 3, and a washer 4. In the event of a lightning strike hitting the panel 1 and attaching to the fastener, sparking, plasma or out-gassing may occur at the locations indicated by reference 5 in FIG. 1.

It is known to provide a spark containment cap over the end of the fastener. The cap forms a sealed cavity around an end of the fastener protruding from the structure. A volume of gas is enclosed in the sealed cavity around the fastener. The gas provides spark suppression, and containment of sparking and plasma outgassing that may occur between the composite structure and the metal fastener during any lightning strike. The cap is sealed to the structure by a curable sealant provided around an opening to the sealed cavity.

However, an issue with known spark containment caps is that, during installation, damage can be caused to the surface of the structure or panel to which the cap is applied. Most notably, many aircraft panels have painted surfaces which help to protect against electrical arcing between the fastener and the panel. As such, damage to the paint can leave parts of the panel exposed, and therefore more susceptible to the effects of electrical arcing.

This problem may be expected during installation of "blind" fasteners, since during such installations access to only one side of the panel is provided, which can make installing a cap without damaging the paint layer more challenging. Such blind fasteners deform to form a bulb, and the forming of the bulb results in a rolling action under high pressure which can rub the paint layer of the structure resulting in loss of the insulating layer.

As such, it is the aim of the present invention to address at least one of the aforementioned problems.

SUMMARY OF THE INVENTION

A first aspect of the invention provides a method of joining a first workpiece to a second workpiece, the method comprising a) securing a spark containment cap to the first workpiece, the cap comprising a washer and a cap body defining an air cavity, wherein the washer is electrically insulating; b) inserting a tail of a fastener into the air cavity through the second workpiece, the first workpiece and the washer; and c) tightening the fastener so that the tail of the fastener urges the washer against the first workpiece and the first and second workpiece are clamped between the washer and a head of the fastener. The method steps a), b) and c) are performed in order. That is, the tail of the fastener is inserted into the air cavity in step b) after the spark containment cap has been secured to the first workpiece in step b); and the fastener is tightened in step c) after the tail of the fastener has been inserted into the air cavity in step b).

In exemplary embodiments, the tail of the fastener comprises a sleeve which deforms as it urges the washer against the first workpiece.

In exemplary embodiments, the spark containment cap is secured to the first workpiece by adhering it to the workpiece with a sealant material.

In exemplary embodiments, the cap comprises an annular pocket, and the cap is secured to the first workpiece by injecting the sealant material into the annular pocket so that the sealant material in the annular pocket adheres the cap to the first workpiece.

A second aspect of the invention provides a spark containment cap comprising a cap body defining an air cavity and a washer secured to the cap body, wherein the washer is electrically insulating. The air cavity does not contain a head of a fastener or a tail of a fastener.

The washer may comprise a washer aperture which is free of obstructions so that a tail of a fastener can be introduced into the air cavity through the washer aperture during step b) of the method of the first aspect.

In exemplary embodiments, the washer is received within the air cavity.

In exemplary embodiments, the washer is received in one or more recesses.

In exemplary embodiments, the cap body comprises three or more axially extending ribs, each rib comprises a respective rib recess, and the washer is received in the rib recesses.

In exemplary embodiments, the washer is adhered to the cap body.

In exemplary embodiments, the cap body comprises an annular base terminating at a base rim which surrounds an opening into the air cavity, and the washer is fitted to the annular base.

In exemplary embodiments, the washer is flush with the base rim.

In exemplary embodiments, the cap body comprises an apex having an internal engagement feature.

In exemplary embodiments, the cap further comprises an annular skirt providing an annular pocket extending around a circumference of the cap, the annular skirt being arranged to receive an annular bead of a curable sealing material around the opening into the air cavity.

In exemplary embodiments, the air cavity has a maximum depth D (typically at an axis of the cap) and a maximum width W (typically at a base of the cap), wherein an aspect ratio D/W of the air cavity is greater than 2 or greater than 2.5.

In exemplary embodiments, the washer has an inner face, an outer face, an inner edge and an outer edge, wherein the inner face of the washer faces the air cavity.

In exemplary embodiments, the washer comprises a washer body carrying a layer or coating of electrically insulating material.

A third aspect of the present invention provides a method of manufacturing a spark containment cap, the method comprising providing a cap body defining an air cavity; pre-installing a washer in the cap body by inserting a washer into the air cavity, wherein the washer is electrically insulating; and securing the washer to the cap body.

Optionally the washer moves as it is inserted into the air cavity, with the cap body being held stationary. Alternatively, the cap body may move as the washer is inserted into the air cavity, with the washer being held stationary. Alternatively, both the washer and the cap body may move as the washer is inserted into the air cavity.

A fourth aspect of the present invention provides a method of forming a joint within a structure, the method comprising providing a spark containment cap, said cap having a cap body defining an air cavity arranged to enclose the end of a fastener and an insulating washer located within the air cavity of the spark containment cap, providing a structure comprising a first workpiece, a second workpiece and having an aperture passing there-through, securing the spark containment cap about said aperture, passing a blind fastener through said aperture such that an end of the fastener passes through the washer and is received within the air cavity of the spark containment cap, said blind fastener comprising a head, a fastener shaft and a sleeve, and actuating the sleeve of the blind fastener towards the structure so as to urge the washer against the structure thereby clamping the first and second workpieces between the head of the fastener and the washer.

A further aspect of the present invention comprises an aircraft comprising a spark containment cap according to the second aspect of the invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 2:
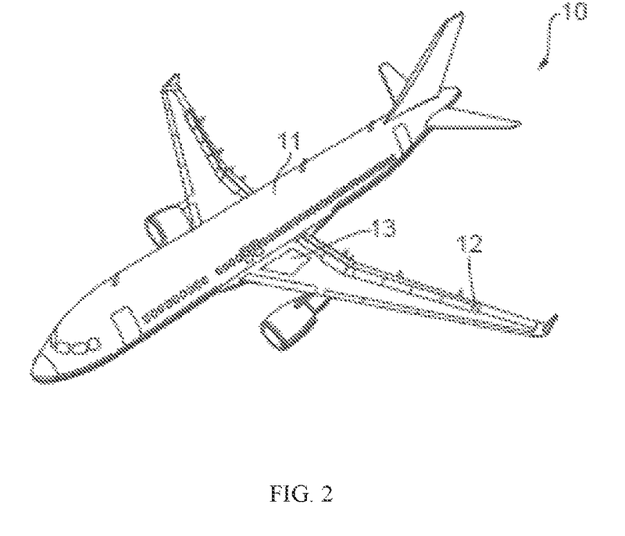
FIG. 2 is a perspective view of an aircraft.

An aircraft 10 is shown in FIG. 2. The aircraft 10 includes a fuselage 11. Two wings 12 extend from the fuselage 11. It will be appreciated that the fuselage 11 and wings 12 may take a variety of different planform shapes and profiles depending on the particular application. Fuel tanks 13 are formed in the fuselage 11 and wings 12. One such fuel tank 13 is schematically shown in FIG. 2. The fuel tanks 13 are formed by a structure or structures forming part of the aircraft 10.

Figure 3:
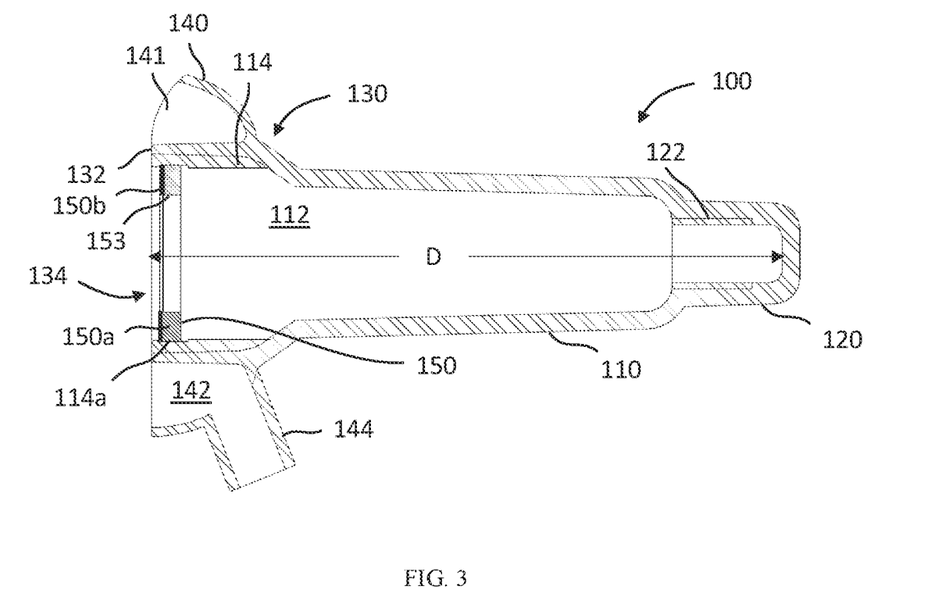
FIG. 3 is a cross-sectional side view of a spark containment cap according to a first aspect of the present invention, in which the electrically insulating washer is secured to the cap via a snap-fit.

A spark containment cap 100 according to a first aspect of the present invention is illustrated in FIG. 3.

The cap 100 typically comprises Nylon (or another suitable fuel resistant polymer) and has a cap body 110, the interior volume of which defines an air cavity 112.

The cap body 110 extends from an apex 120 located at one end of the cap 100 to an annular base 130 located at another end of the cap 100. The annular base 130 terminates at an annular base rim 132 which defines an opening 134 into the air cavity 112. The opening 134 and air cavity 112 are sized such that, in use, the shaft of a fastener (not shown) may be passed through the opening 134 to be received within the air cavity 112. The cap body 110 comprises four ribs 114, two of which are visible in FIG. 3.

The air cavity 112 has a maximum depth D (indicated in FIG. 3) at an axis of the cap 100, and a maximum width W (indicated in FIG. 4) at the annular base 130 of the cap 100. In the illustrated embodiment, an aspect ratio D/W of the air cavity 112 is about 3. This high aspect ratio enables the air cavity to receive a blind fastener as described below.

The profile of the apex 120 is shaped so as to enable a tool (e.g. a locating tool) to be received within the apex 120 during use. In the illustrated embodiment, the apex 120 has a teat-like shape in profile, however it will be appreciated that in alternative embodiments other suitable shapes may be used.

The apex 120 also comprises an internal engagement portion 122 located at its interior surface for engagement with said tool during installation, as will be described in greater detail below.

In the spark containment cap illustrated in FIG. 3, the internal engagement portion 122 is provided as an internal thread for engagement with a corresponding external thread located on a distal end of a locating tool (not shown). However, in other embodiments, it will be appreciated that any other suitable engaging feature (e.g. an interference fit) may be used.

The spark containment cap 100 also includes an annular skirt 140 extending outwardly from the annular base 130. The annular skirt 140 extends outwardly from the annular base 130 so as to define an annular pocket 142 extending around a circumference of the cap 100.

The annular pocket 142 is configured to receive an annular bead of a curable sealing material in use, which can be injected into the annular pocket 142 via an inlet 144. As will be described in greater detail below, the annular bead of curable sealing material, upon curing, provides a gas-tight seal around the opening 134 into the air cavity 112 and also enables the spark containment cap 100 to be secured to a structure (not shown).

However, it will be appreciated that in other embodiments, any other suitable securing and/or sealing means may be used in order to secure the spark containment cap to a corresponding structure and to provide a seal about the opening to the air cavity.

The spark containment cap 100 also comprises a washer 150 secured within the air cavity 112. The washer 150 is electrically insulating.

The electrically insulating washer 150 is typically between 1mm to 2mm in thickness and comprises an inner face and an outer face. The inner face of the washer 150 faces into the air cavity 112 so that, when in use, it can contact a tail end of a fastener in the air cavity, as will be described in greater detail below.

The electrically insulating washer 150 also comprises an aperture extending through its thickness which defines an inner edge 153 of the washer 150. An outer edge of the washer 150 is defined by the washer's outer circumference.

The aperture has a diameter which is sized so as to enable passage of a fastener shaft (not shown) through the opening 134, through the washer aperture and into the air cavity 112 of the cap 100. Typically, the aperture is sized to be substantially the same diameter as the respective fastener shaft (plus an additional clearance), however it will be appreciated that other such diameters may be used.

Meanwhile, the outer diameter of the washer 150 (from outer edge to outer edge) is typically substantially equal to the diameter of the opening 134.

The material of the washer 150 is chosen so as to be able to withstand the compressive forces applied to the washer 150 by the fastener during use. In the illustrated embodiment, the washer 150 comprises a washer body 150a made from a metallic material (such as aluminium, steel or titanium) carrying a layer 150b of electrically insulating material (such as primer paint, a ceramic coating or any other dielectric material).

Figure 5:
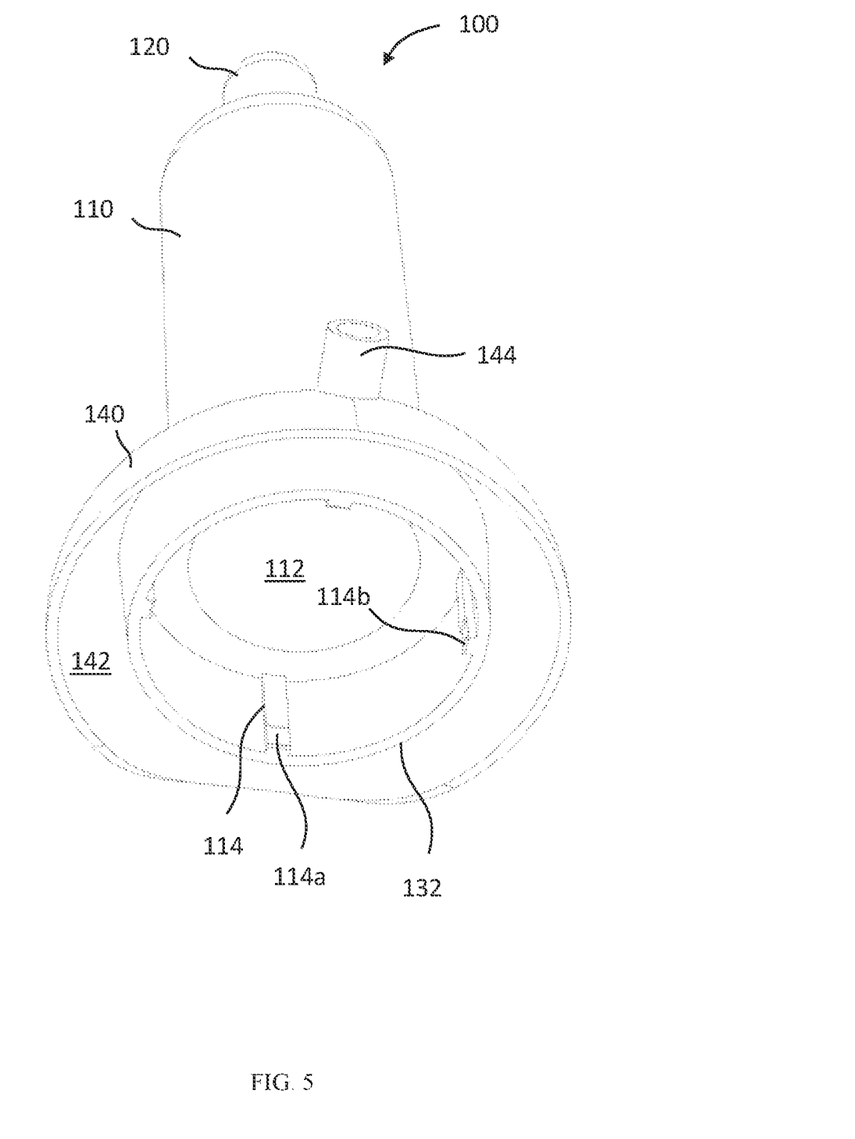
FIG. 5 is a perspective view of the spark containment cap illustrated in FIG. 3 showing the four axial ribs.

In the illustrated embodiment, the washer 150 is secured to the cap body 110 by four axially extending ribs 114 which extend along the interior surface of the cap body 110 at the annular base region 130 of the cap 100. The four axially extending ribs 114 are shown in FIG. 5. However, it will be appreciated that in other embodiments any number of ribs may be used. For example, in some embodiments, the cap may only comprise three axially extending ribs.

Each rib 114 has a respective recess 114a which is configured to receive the washer 150 thereby forming a releasable snap-fit between the washer 150 and the cap body 110. One end of each recess 114a is terminated by a respective end stop 114b. However, it will also be appreciated that in other embodiments, other securing means may be used.

Figure 4:
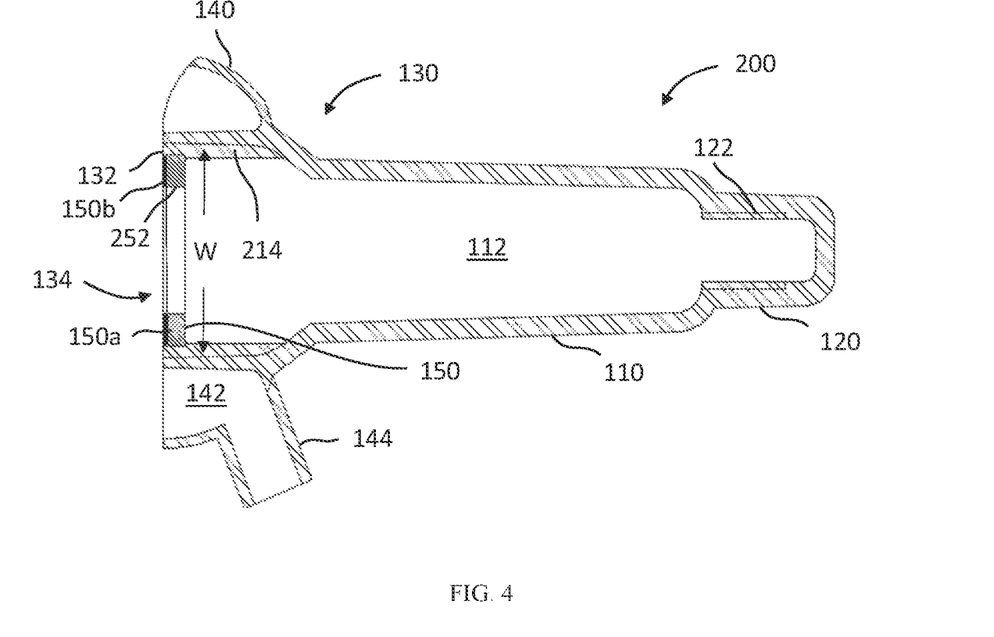
FIG. 4 is a cross-sectional side view of a spark containment cap according to an alternative embodiment of the present invention, in which the electrically insulating washer is ultrasonically welded to the cap.

For example, a spark containment cap 200 according to an alternative embodiment of the present invention is illustrated in FIG. 4.

The majority of the features of the spark containment cap illustrated in FIG. 4 are substantially the same as those which have been described in relation to FIG. 3. As such, for the sake of conciseness, only features that differ from those of the previous embodiment are discussed in detail. Features corresponding to those of the previous embodiment have been given the same reference numbers.

Unlike the spark containment cap 100 illustrated in FIG. 3, in the spark containment cap 200 illustrated in FIG. 4, the washer 150 is fitted to the annular base 130 substantially flush with the base rim 132. The ribs 214 are different to the ribs 114 in the previous embodiment—the washer is fitted into a recess at the end of each rib 214 so that the layer 150b forming the outer face of the washer is flush with the base rim 132. Unlike the embodiment of FIG. 5, where each rib 114 has an end stop 114b at one end of its recess 114a, in FIG. 4 the recess at the end of each rib has no such end stop.

In the spark containment cap 200 illustrated in FIG. 4, the electrically insulating washer 150 is adhered to the cap body by an ultrasonic weld with the ribs 214, rather than as a snap-fit connection. However, it will be appreciated that in other embodiments, any other suitable type of adhesion may be used.

A method of joining a first workpiece to a second workpiece to form a joint incorporating the afore-described spark containment cap 100 will now be described with reference to FIGS. 6A to 6F.

Figure 6A:
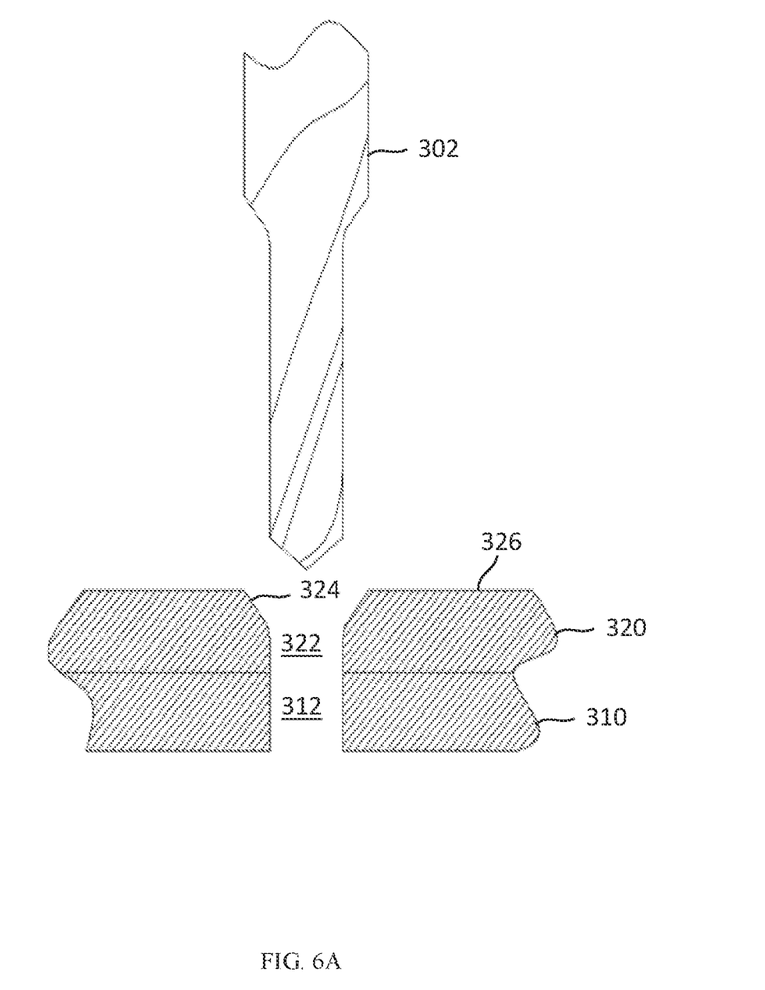
FIGS. 6A to 6F are cross-sectional side views of a structure during various stages of installation of the spark containment cap of FIG. 3.

In a first step of the method, an aperture is drilled through a pair of workpieces, hereinafter a first workpiece 310 and a second workpiece 320, such that each workpiece is provided with a respective aperture 312, 322 as shown in FIG. 6A.

In the illustrated embodiments, the first and second workpieces 310, 320 are placed together and punctured by a drill-bit 302 such that the first and second apertures 312, 322 are co-axial with one another. However, in other embodiments, it will be appreciated that the first and second apertures may be formed separately.

In the illustrated embodiment, the first workpiece and second workpieces 310, 320 are a pair of composite aircraft components. For example the second workpiece 320 may be an aircraft skin panel with an aerodynamic outer surface 326. The aircraft skin panel may provide a boundary of the aircraft fuel tank 13, and the first workpiece 310 may be a rib, spar or other structure inside the fuel tank 13.

The second aperture 322 also comprises a countersunk portion 324 to ensure that any fasteners received within the aperture 322 are substantially flush with the aerodynamic outer surface 326.

However, it will be appreciated that in other embodiments, the panels may be metallic panels, and in further alternatives, the first and second workpieces may be any other suitable form of structure.

Figure 6B:
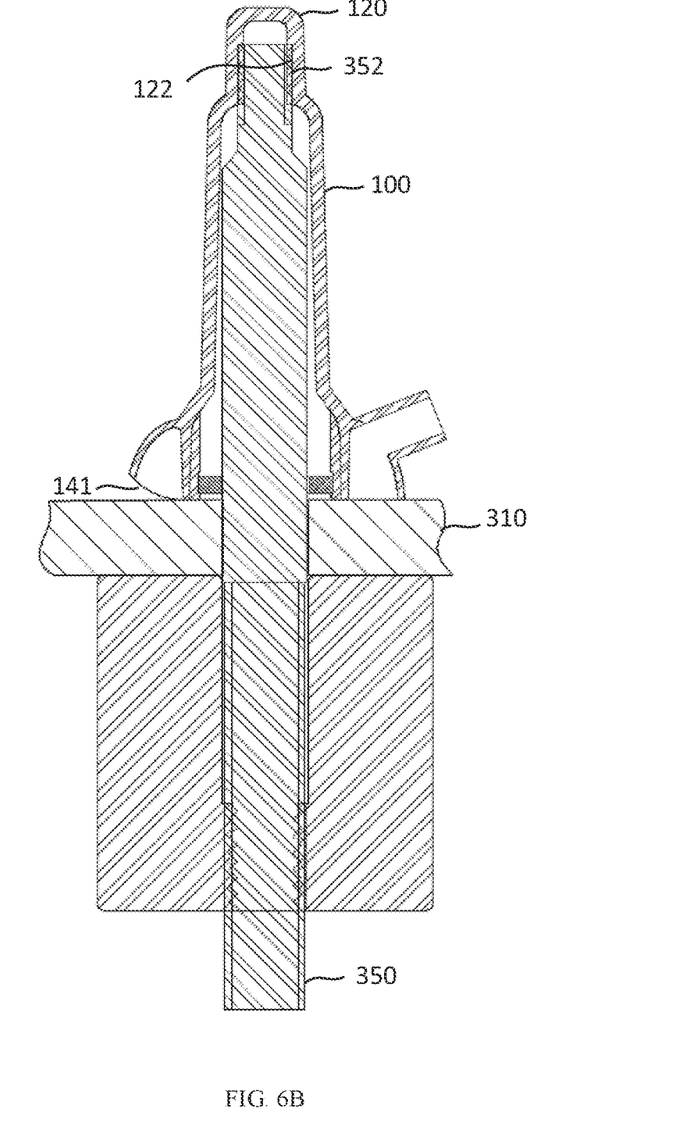

Once the first and second workpieces 310, 320 have each been provided with a respective aperture 312, 322, the spark containment cap 100 is secured to the first workpiece about the aperture 310, as shown in FIG. 6B.

In the illustrated embodiment, the spark containment cap 100 is secured about the aperture 312 using a locating tool 350. During installation, the locating tool 350 is inserted through one or both apertures 312, 322 and placed into engagement with the cap 100.

In the illustrated embodiment, the locating tool 350 is provided with an engagement portion 352, in this case a threaded portion, located at its distal end for engagement with the corresponding internal engagement portion 122 located at the apex 120 of the cap 100, thereby allowing the locating tool 350 to be releasably secured to the cap 100.

The locating tool 350 can then be secured such that the spark containment cap 100 is held in proper alignment against the first workpiece 310 and over the respective aperture 312 via the locating tool 350, as shown in FIG. 6B.

It will be appreciated that in other embodiments, the cap 100 may alternatively simply be placed over the aperture, and hence in some embodiments, the locating tool 350 and corresponding internal engagement portion 122 may be omitted.

Figure 6C:
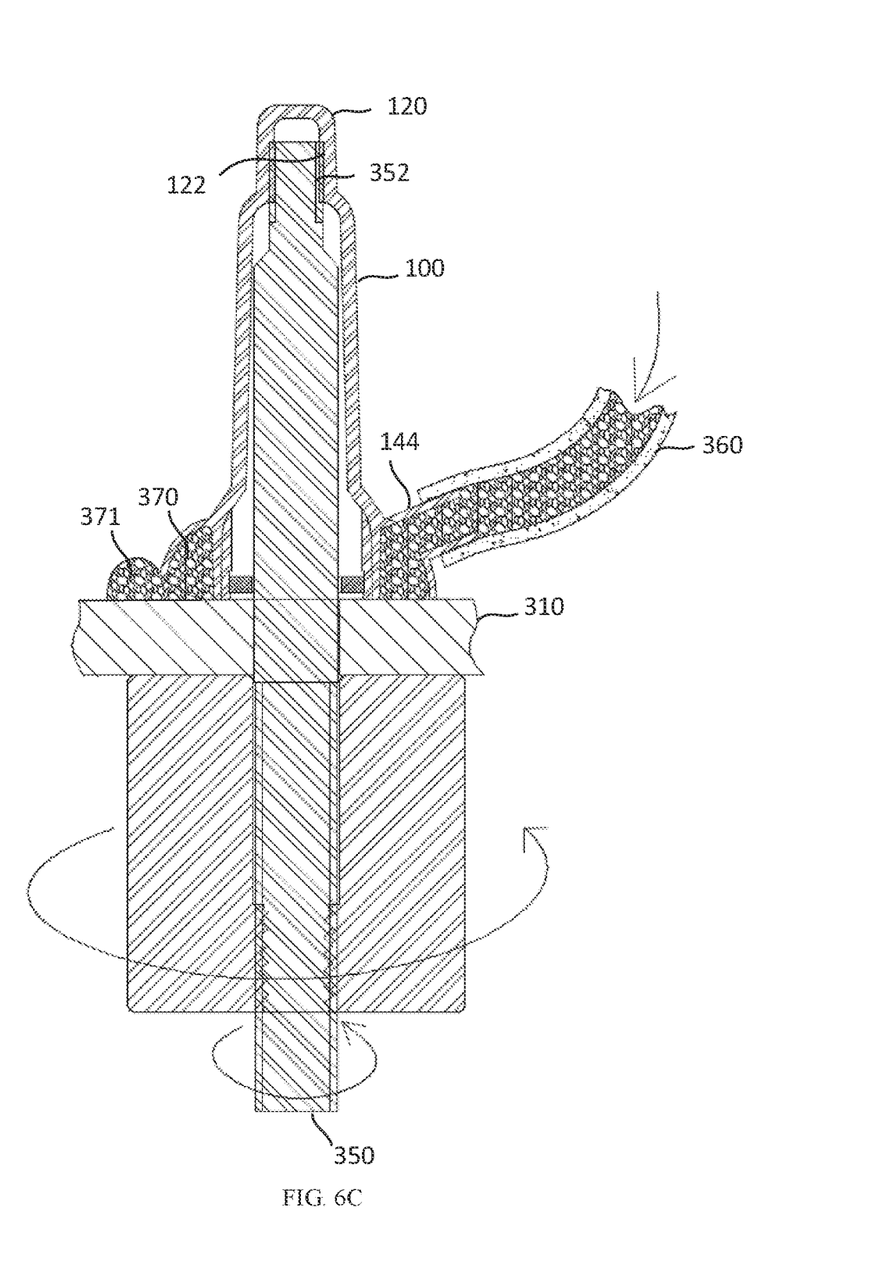

Once the spark containment cap 100 has been secured about the aperture 310, the spark containment cap 100 is permanently secured to the workpiece 310, as illustrated in FIG. 6C.

In the illustrated embodiment, a sealant material is injected into the annular pocket 142 via the inlet 144. In the illustrated embodiment, the sealant material is injected using a sealant gun 360, although it will be appreciated that any other suitable method could be used.

For example, in some alternative embodiments, the sealant may be applied to the rim 132 of the cap 100, and the cap 100 applied to the workpiece 310 by hand. However, when applying caps in this manner, the cap 100 must be applied quickly following the application of the sealant. This places a significant burden on assembly line workers and can also lead to alignment errors.

Advantageously, providing a cap 100 which can be injected with sealant after the cap has been located can help to reduce the burden place on assembly line workers and can also help to reduce alignment errors.

Once the sealant material has been injected into the annular pocket 142, the sealant is allowed to cure. In doing so, an annular bead of sealant 370 is provided around a circumference of the cap 100 which both adheres the cap 100 to the workpiece 310 and also provides a gas-tight seal about the opening 134 to the air cavity 112.

The annular pocket 142 has an opening 141 opposite the inlet 144. As the sealant is injected, air escapes through the opening 141. When the annular pocket 142 is full, sealant 371 flows out of the opening 141 as shown in FIG. 6C.

Once the sealant material has been suitably cured, and the cap 100 adhered to the workpiece 310, the locating tool 350 can be disengaged from the cap 100, in this case by rotating the locating tool 350 such that the threaded engagement portion 352 of the tool 350 disengages with the corresponding internal engagement portion 122 of the cap 100.

Figure 6D:
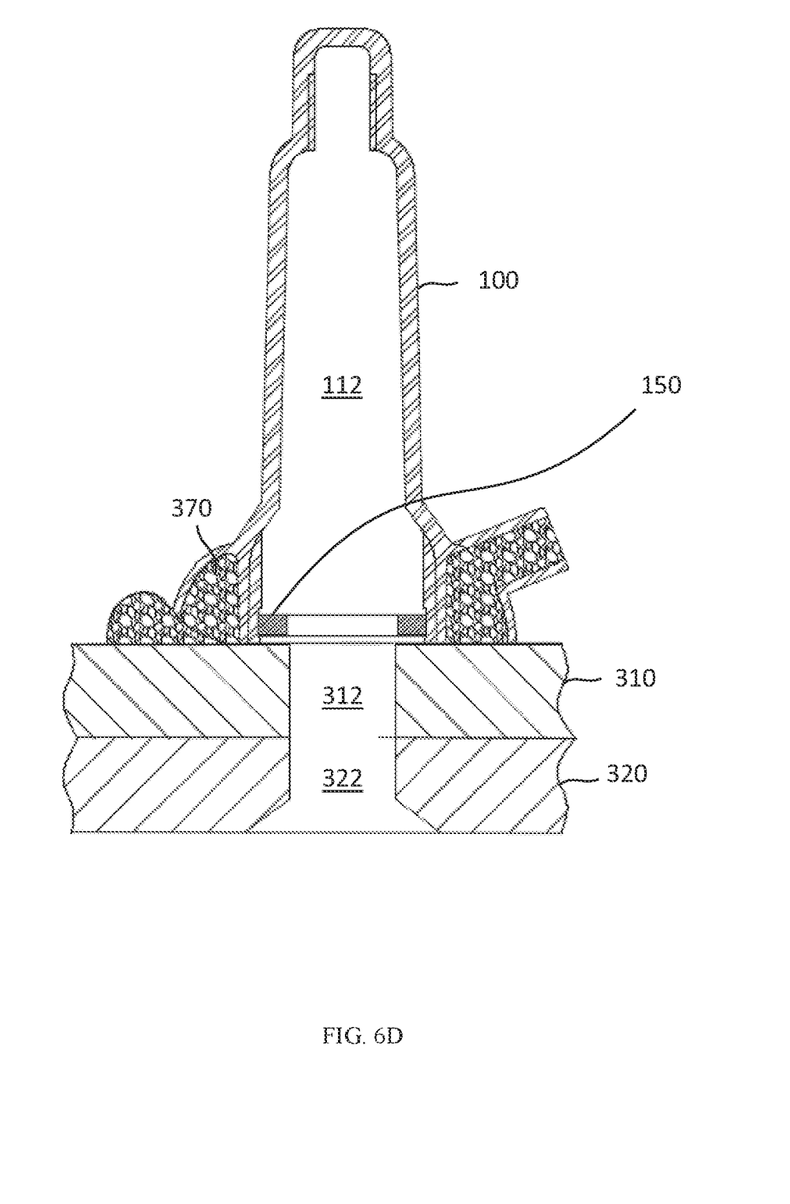

As illustrated in FIG. 6D, the first and second workpieces 310, 320 can then be brought back together such that the first and second apertures 312, 322 are in co-axial alignment. Once aligned, a "blind" fastener 400 can then be installed.

Figure 6E:
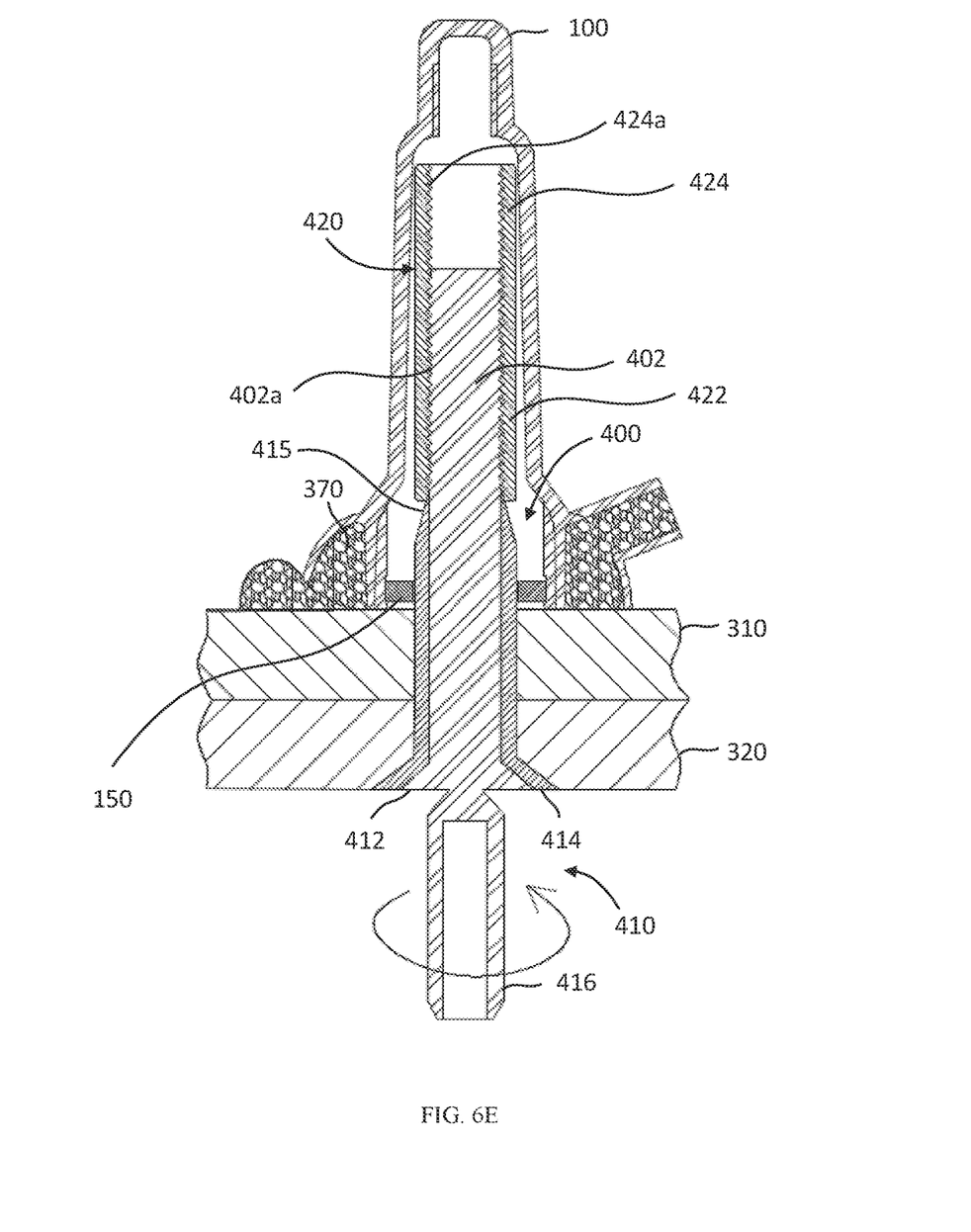

As shown in FIG. 6E, the "blind" fastener 400 comprises a head 410 and a tail 420.

The head 410 of the fastener comprises a frustoconical shaft head 412, a head end of a fastener shaft 402, and an insert 414 which surrounds the shaft head 412 and the head end of the fastener shaft 402. The shaft head 412 has an engagement feature 416 for engagement with a corresponding tool (e.g. a drill bit), the engagement feature 416 being frangibly connected to the shaft head 412.

The tail 420 of the fastener comprises a tail end of the fastener shaft 402; and a sleeve 422 and nut 424 fitted onto the tail end of the fastener shaft 402. The sleeve 422 may be internally threaded as shown, or it may be unthreaded. The nut 424 is internally threaded, and the internal threads of the nut 424 engage with external threads of the tail end of the shaft 402. The sleeve 422 and the nut 424 are formed as a single piece.

The tail 420 of the fastener 400 is passed through the first and second apertures 312, 322, through the opening 132 of the spark containment cap 100 and through the washer aperture 152 to be received within the air cavity 112 of the cap 100 as shown in FIG. 6E.

As shown in FIGS. 3, 4 and 6D, the washer 150 is pre-installed in the cap body before the joint is formed. Therefore the air cavity 112 in FIGS. 3, 4 and 6D does not contain a tail or head of a fastener, or any other part of a fastener. Also, the washer aperture 152 is free of obstructions so that the tail 420 of the fastener 400 can be later introduced into the air cavity 112 through the washer aperture 151 during installation as shown in FIG. 6E.

Once inserted into the air cavity 112 of the cap 100, the insert 414 forms an interference fit with the workpieces 310, 320. The insert 414 also has an axially grooved tip 415 which is received as an interference fit inside the sleeve 422. The interference fit between the insert 414 and the workpieces 310, 320 prevents rotation of the insert 414, and the interference fit between the insert 414 and the sleeve 422 prevents rotation of the sleeve 422 and the nut 424. Optionally, the insert 414 may also be gripped by an installation tool (not shown) to prevent it from rotating.

Although not shown in the illustrated embodiment, in some embodiments the cap body may comprise at least one engagement feature configured for engagement with a tail portion of a blind fastener. For example, the interior surface of the cap body 110 may also include one or more serrations for engagement with the sleeve 422 to help further prevent rotation of the sleeve 422.

The fastener 400 is then tightened by rotating the engagement feature 416 with an installation tool (not shown), as shown in FIG. 6E. As the fastener 400 is tightened, the threaded connection between the fastener shaft 402 and the nut 424 causes the nut 424 and sleeve 422 to be drawn down towards the head 410 of the fastener 400.

Figure 6F:
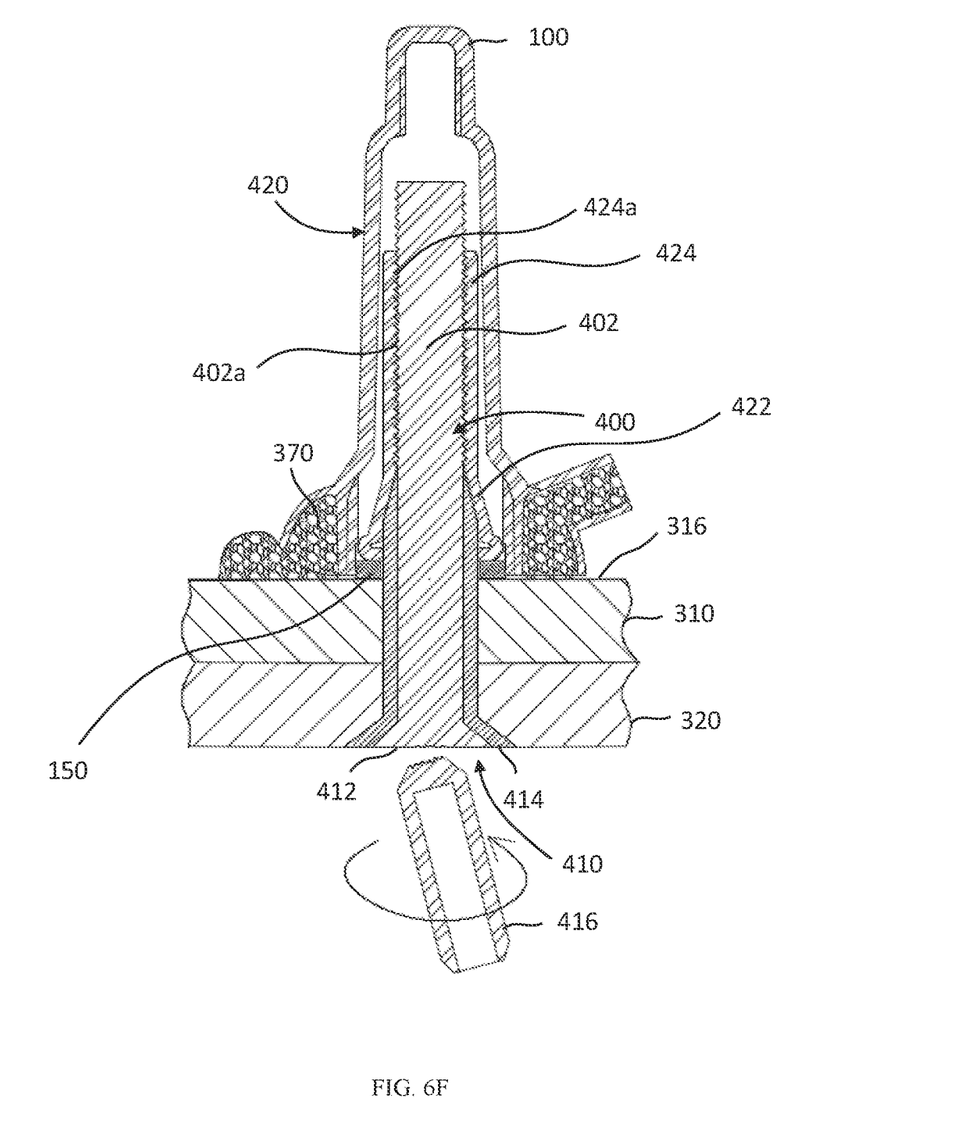

As the sleeve 422 translates towards the head 410, the sleeve 422 is first widened by the tip 415 of the insert, then pushes the washer 150 causing the washer 150 to "defeat" the end stops 114b (i.e. compress the end stops 114b so it can be pushed down towards the first workpiece 310). The washer 150 is pushed down until the layer 150b of electrically insulating material 150b on its outer face comes into contact with an inner surface 316 of the first workpiece 310 as shown in FIG. 6F. The fastener is then tightened further so that the sleeve 422 urges the outer face of the washer 150 against the first workpiece 310, and the first and second workpiece are clamped between the washer 150 and the head 410 of the fastener. The sleeve 422 deforms to form an expanded bulb shown in FIG. 6F as it urges the washer 150 against the first workpiece 310.

It will be appreciated that in embodiments in which the washer is secured substantially flush with the base rim of the cap, such as the embodiment illustrated in FIG. 4, the washer 150 may simple be urged against the surface of the workpiece without moving relative to the cap body.

When the fastener has been fully tightened, the increasing torque causes the engagement portion 416 to snap off as shown in FIG. 6F.

Advantageously, following installation, the electrically insulating washer 150 is provided at the surface of the workpiece 310 where the cap 100 has been installed. Therefore, the washer 150 is able to provide an extra layer of arcing protection at this region of the workpiece 310 covering any damage that may have been caused to the surface of the workpiece during cap installation.

Furthermore, this method also allows for easy application of a washer 150 for so called "blind" structures where access to only one side of a workpiece is permitted during fastener installation.

If the washer 150 was electrically conductive, then if lightning attached to the head 410 of the fastener, current could flow along the shaft 402, across the insert 414, through the washer and then into the workpiece 310. This can cause so-called "voltage sparking" at the interface between the washer and the workpiece. The electrically insulating washer 150 and spark containment cap 100 provide dual protection against such voltage sparking as follows.

Firstly, the high resistance and high dielectric breakdown strength of the layer 150b of electrically insulating material inhibits the flow of current from the washer 150 into the workpiece 310. Secondly, if voltage sparking does occur at this (or any other) location, then the spark is contained by the spark containment cap 100.

Figure 7:
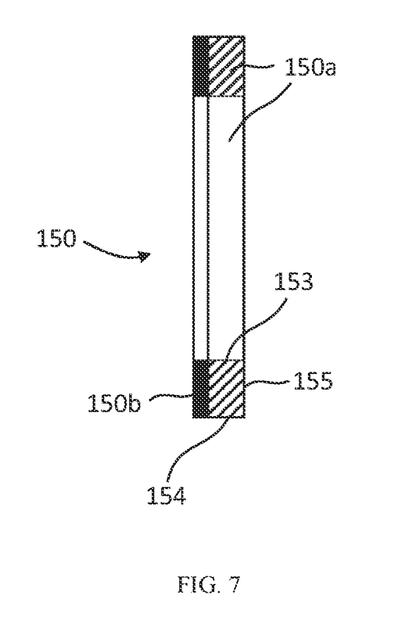
FIG. 7 is an enlarged cross-sectional view of the washer.

FIG. 7 is an expanded cross-sectional view of the washer 150. The layer 150b of electrically insulating or dielectric material is only applied to the outer face of the metal body 150a of the washer, which is the part of the washer that contacts the workpiece 310. The other surfaces of the metal body 150a (i.e. the inner edge 153, outer edge 154 and inner face 155) are uncoated.

Figure 8:
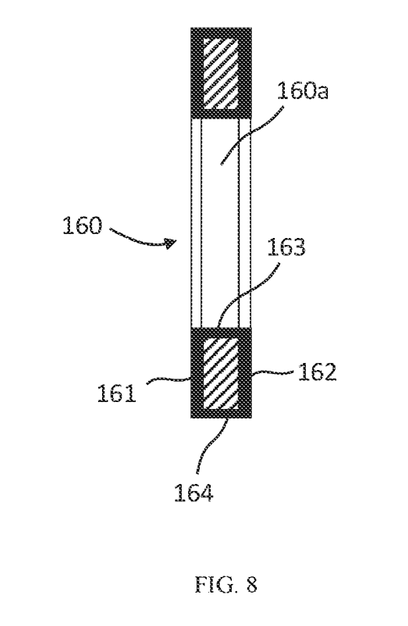
FIG. 8 shows a cross-sectional view of a fully coated washer.

In an alternative embodiment shown in FIG. 8, the washer 150 of FIG. 7 may be replaced by a washer 160 shown in FIG. 8. The washer 160 comprises a metal washer body 160a which is fully encapsulated in a coating 161-164 of electrically insulating or dielectric material. The coating covers the entire outer surface of the metal washer body 160a, and includes a coating 161 on the inner face, a coating 162 on the outer face, a coating 163 on the inner edge and a coating 164 on the outer edge.

The thickness of the layer 150b or coating 161-164 may vary. In the example of a primer paint, the layer 150b or coating 161-164 may have a thickness of the order of 15 micron.

The coating 162 on the inner face of the washer may be scraped off by the sleeve 422 of the fastener, but this is not critical to the performance of the washer since the coating 161 on the outer surface (which contacts the workpiece 310) is less likely to be damaged during installation. The coating 163 on the inner edge of the washer is particularly beneficial, since it provides a further barrier to current flow, adding an element of redundancy.

Thus, preferably an outer face and/or an inner edge of the washer body 160a carries a layer or coating of electrically insulating material.

Figure 9:
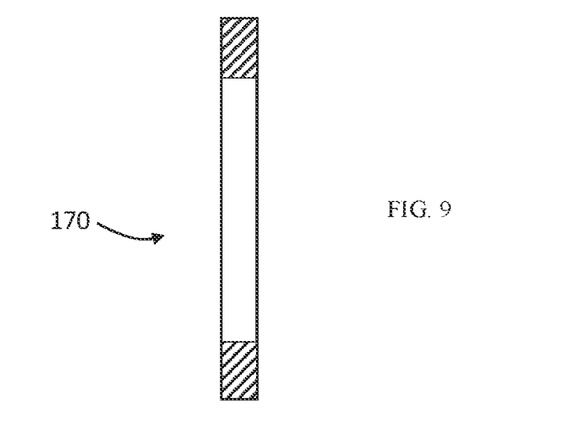
FIG. 9 shows a cross-sectional view of an uncoated electrically insulating washer.

The electrically insulating washers 150, 160 have a metal body 150a, 160a with the necessary mechanical properties, and an electrically insulating layer 150b or coating 161-164 with the necessary electrical properties. In an alternative embodiment shown in FIG. 9, the washers 150, 160 may be replaced by an electrically insulating washer 170 made entirely from an electrically insulating material such as ceramic, glass, composite material (for instance glass-fibre-reinforced epoxy resin, optionally with a small amount of carbon-fibre reinforcement) and/or a high strength polymeric material. In this case, no electrically insulating layer or coating is required.

The washer 150, 160, 170 is electrically insulating, and as explained above this inhibits the flow of current from the washer into the workpiece 310.

Preferably the washer is configured to allow no more than 125 mA of current through the washer, as specified in FAA Advisory Circular AC 25.981-1D.

By way of example, the washer may be configured to allow no more than 125 mA to flow into the workpiece 310 via the washer at a test voltage of 500V or more. This equates to a resistance of at least 4000Ω, although in practice the electrical resistance of the washer may be much higher. The electrical performance of the washer may be tested using a DC voltage, but it is also possible to test with an AC voltage or impulse voltage. Suitable test techniques can be found in the International Standard IEC 61180:2016, for example.

Typical voltages between fasteners and composite for directly struck fasteners are somewhere under 600V. That gives a minimum resistance for the washer of about 4800Ω, which preferably is maintained at a voltage of up to 600V or 1500V.

In summary, a method of joining a first workpiece to a second workpiece is described, the method comprising: a) securing a spark containment cap to the first workpiece, the cap comprising a and a cap body defining an air cavity, wherein the washer is electrically insulating; b) inserting a tail of a fastener into the air cavity through the second workpiece, the first workpiece and the washer; and c) tightening the fastener so that the tail of the fastener urges the washer against the first workpiece and the first and second workpiece are clamped between the washer and a head of the fastener. Optionally the washer is secured to the cap body by a snap-fit joint; and/or adhered to the cap body (for instance by an ultrasonic weld).

A spark containment cap is also described, comprising a cap body defining an air cavity and a washer secured to the cap body, wherein the washer is electrically insulating. The washer is pre-installed in the cap body before the joint is formed. The air cavity does not contain a head of a fastener or a tail of a fastener. Rather, the tail of the fastener is only introduced into the air cavity during step b) of the method.

In exemplary embodiments, the washer is secured to the cap body by forming a snap-fit joint as the washer is inserted into the air cavity.

In exemplary embodiments, the washer is secured to the cap body by adhering the washer to the cap body.

In exemplary embodiments, the washer is secured to the cap body by ultrasonic welding.

In exemplary embodiments, the cap body comprises an apex having an internal engagement feature such as an internal thread.

In exemplary embodiments, the washer comprises a washer body carrying a layer or coating of electrically insulating material, such as paint. Preferably an outer face and/or an inner edge of the washer body carries the layer or coating of electrically insulating material. The washer body may be made of an electrically conductive material, such as metal.

Preferably the washer has an electrical resistance greater than 1000Ω, or greater than 4000 g.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of joining a first workpiece to a second workpiece, the method comprising:
   a) securing a spark containment cap to the first workpiece, the cap comprising a washer and a cap body defining an air cavity, wherein the washer is electrically insulating;
   b) inserting a tail of a fastener into the air cavity through the second workpiece, the first workpiece and the washer; and
   c) tightening the fastener so that the tail of the fastener urges the washer against the first workpiece and the first and second workpiece are clamped between the washer and a head of the fastener.

2. The method according to claim 1, wherein the tail of the fastener comprises a sleeve which deforms as it urges the washer against the first workpiece.

3. The method according to claim 1, wherein the spark containment cap is secured to the first workpiece by adhering it to the workpiece with a sealant material.

4. The method according to claim 3, wherein the cap comprises an annular pocket, and the cap is secured to the first workpiece by injecting the sealant material into the annular pocket so that the sealant material in the annular pocket adheres the cap to the first workpiece.

5. A spark containment cap comprising: a cap body defining an air cavity;
   and a washer secured to the cap body, wherein the washer is electrically insulating, and the air cavity does not contain a head of a fastener or a tail of a fastener.

6. The spark containment cap according to claim 5, wherein the washer is received within the air cavity.

7. The spark containment cap according to claim 6, wherein the washer is received in one or more recesses.

8. The spark containment cap according to claim 7, wherein the cap body comprises three or more axially extending ribs, each rib comprises a respective rib recess, and the washer is received in the rib recesses.

9. The spark containment cap according to claim 5, wherein the washer is adhered to the cap body.

10. The spark containment cap according to claim 5, wherein the cap body comprises an annular base terminating at a base rim which surrounds an opening into the air cavity, and the washer is fitted to the annular base.

11. The spark containment cap according to claim 10, wherein the washer is flush with the base rim.

12. The spark containment cap according to claim 5, wherein the cap further comprises an annular skirt providing an annular pocket extending around a circumference of the cap, the annular skirt being arranged to receive an annular bead of a curable sealing material around the opening into the air cavity.

13. The spark containment cap according to claim 5, wherein the washer has an inner face, an outer face, an inner edge and an outer edge, and wherein the inner face of the washer faces the air cavity.

14. The spark containment cap according to claim 5, wherein the washer comprises a washer body carrying a layer or coating of electrically insulating material.

15. The spark containment cap according to claim 5, wherein the washer comprises a washer aperture which is free of obstructions so that a tail of a fastener can be introduced into the air cavity through the washer aperture.

16. An aircraft comprising a spark containment cap according to claim 5.

17. A method of manufacturing a spark containment cap, the method comprising:
   providing a cap body defining an air cavity;
   pre-installing a washer in the cap body by inserting a washer into the air cavity, wherein the washer is electrically insulating; and
   securing the washer to the cap body.

18. The method according to claim 17, wherein the washer is secured to the cap body by forming a snap-fit joint as the washer as inserted into the air cavity.

19. The method of claim 17, wherein the washer moves as it is inserted into the air cavity.

20. A method of forming a joint within a structure, the method comprising:
   providing a spark containment cap, said cap having a cap body defining an air cavity arranged to enclose the end of a fastener and an insulating washer located within the air cavity of the spark containment cap;
   providing a structure comprising a first workpiece, a second workpiece and having an aperture passing there-through;
   securing the spark containment cap about said aperture;
   passing a blind fastener through said aperture such that an end of the fastener passes through the washer and is received within the air cavity of the spark containment cap, said blind fastener comprising a head, a fastener shaft and a sleeve; and
   actuating the sleeve of the blind fastener towards the structure so as to urge the insulating washer against the structure thereby clamping the first and second workpieces between the head of the fastener and the washer.

* * * * *